C. C. PAGE.
WRAPPING MACHINE.
APPLICATION FILED MAY 28, 1915.

1,290,027.

Patented Jan. 7, 1919.
6 SHEETS—SHEET 1.

Witnesses
Edwin L. Bradford
Wm E. Dyre

Inventor
Clarence C. Page
By Ritter & Ritter
his Attorneys

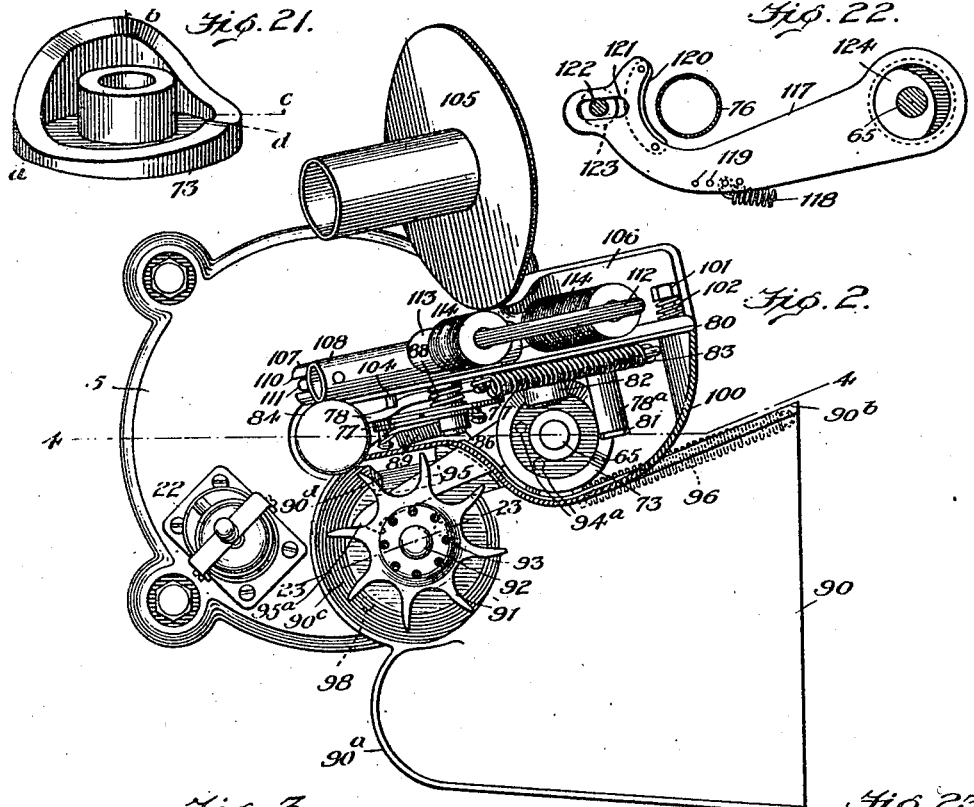
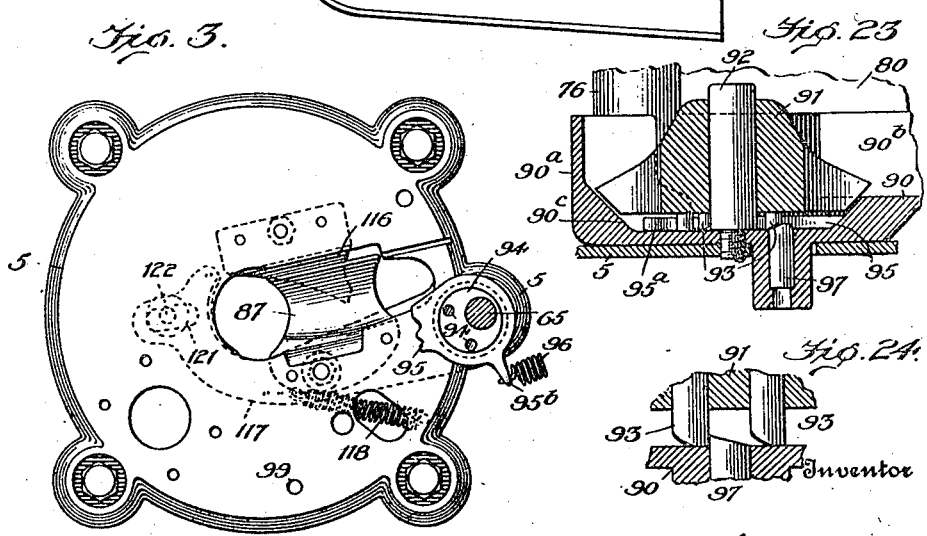

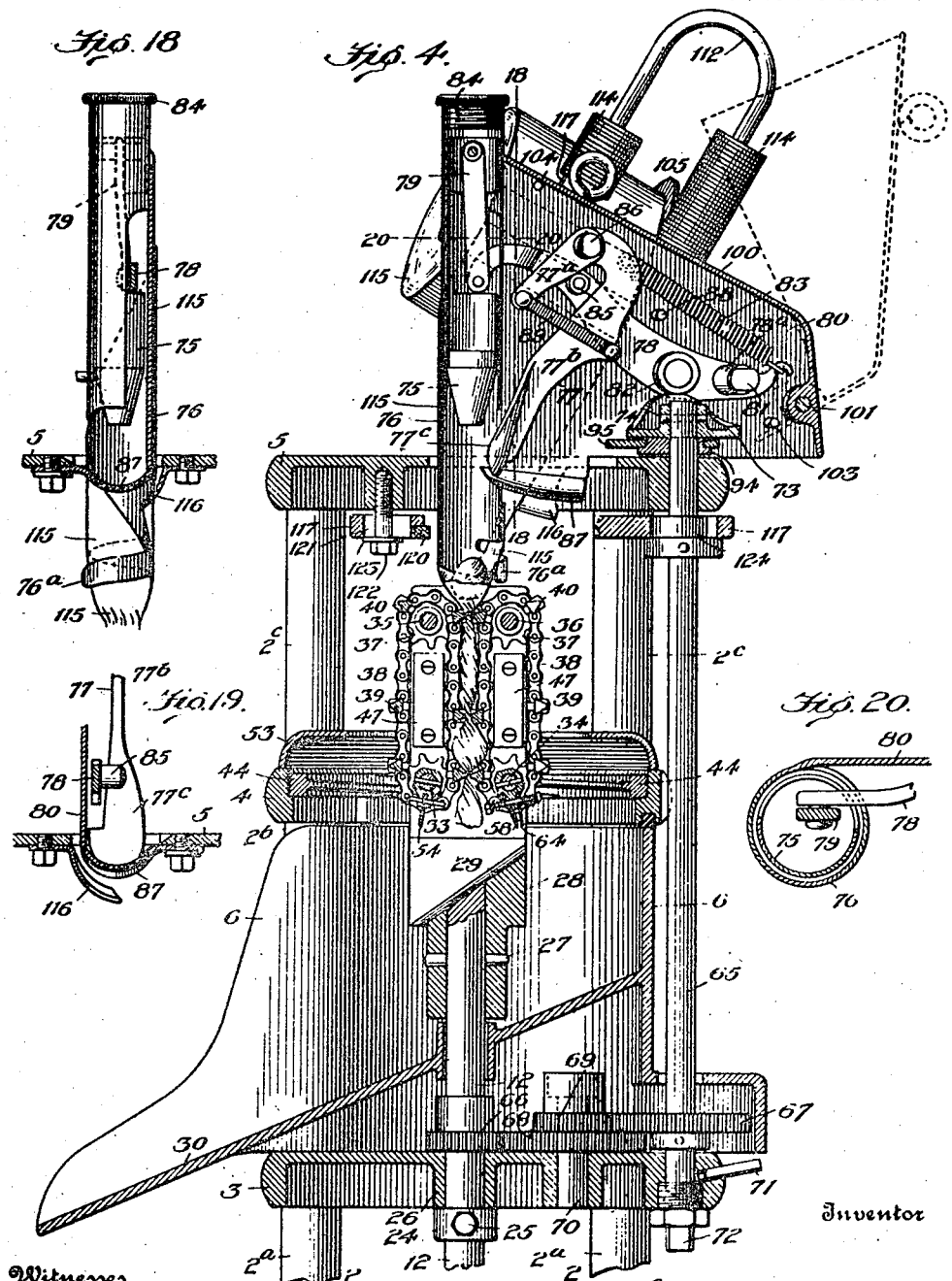

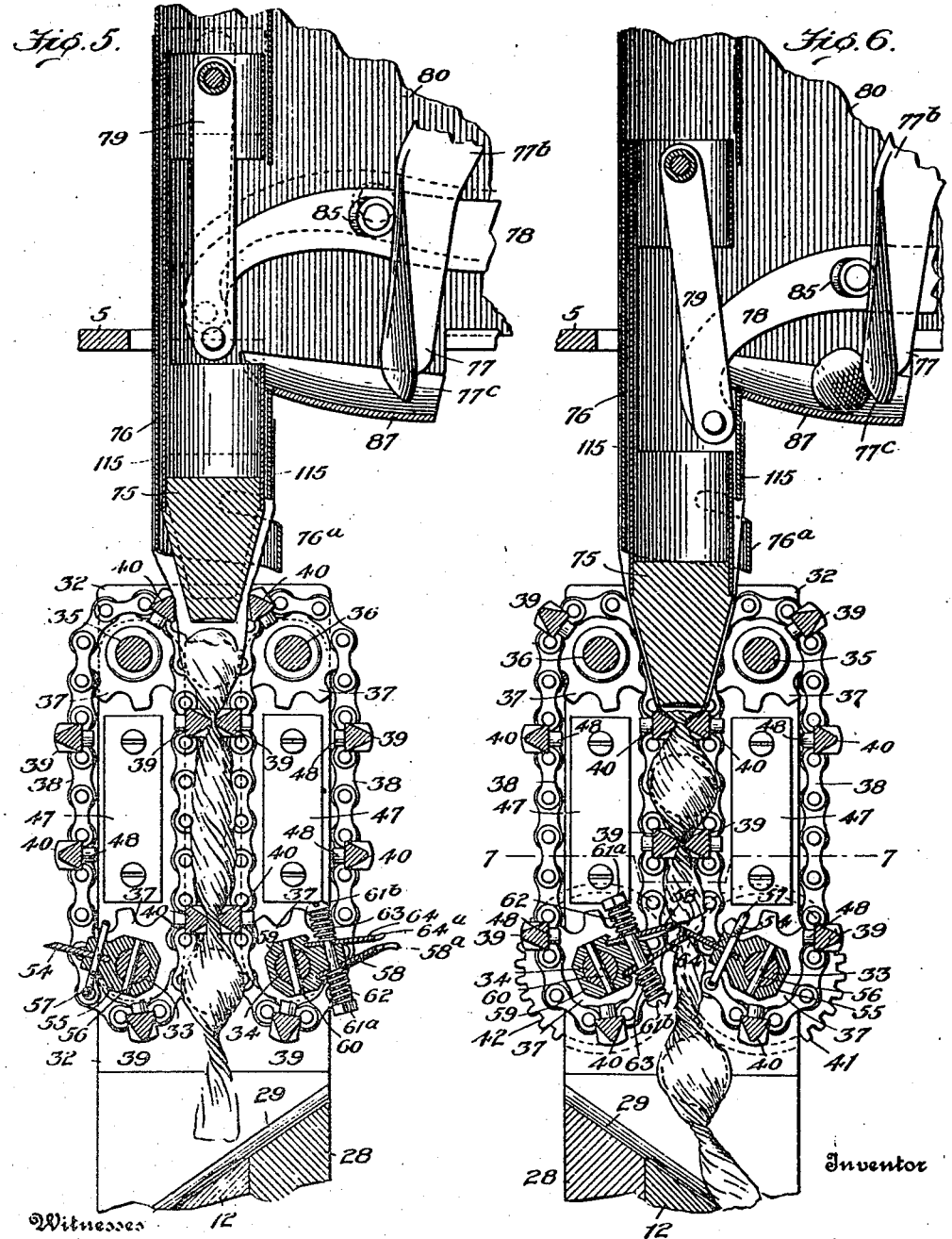

C. C. PAGE.
WRAPPING MACHINE.
APPLICATION FILED MAY 28, 1915.
1,290,027.
Patented Jan. 7, 1919.
6 SHEETS—SHEET 5.
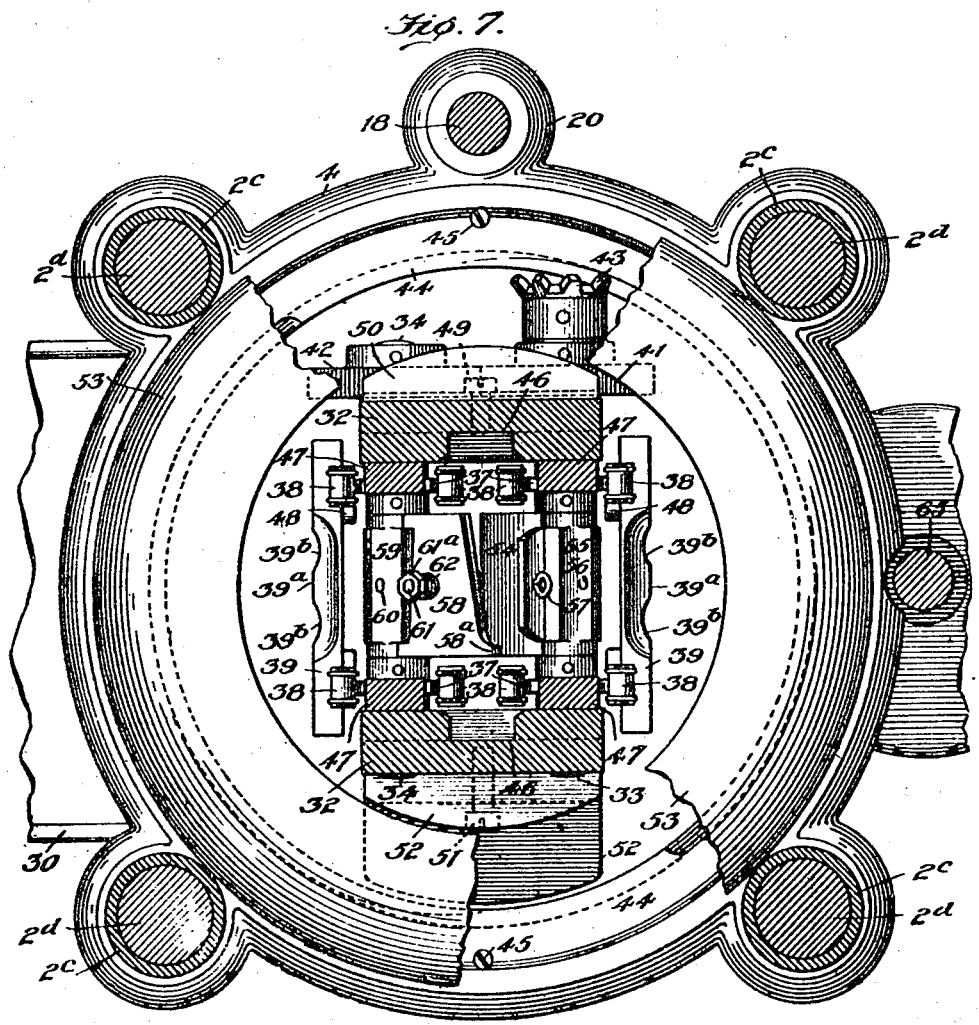
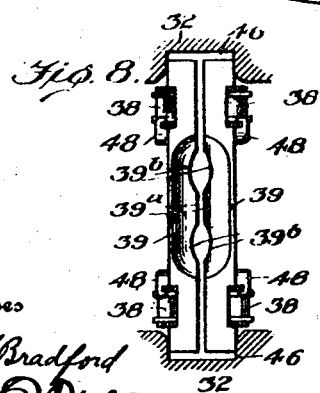
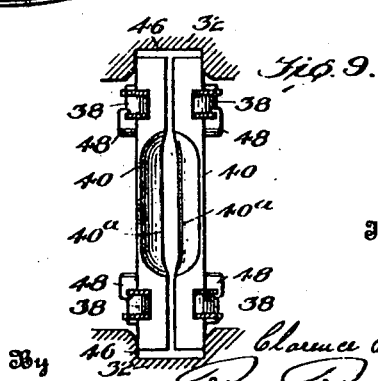

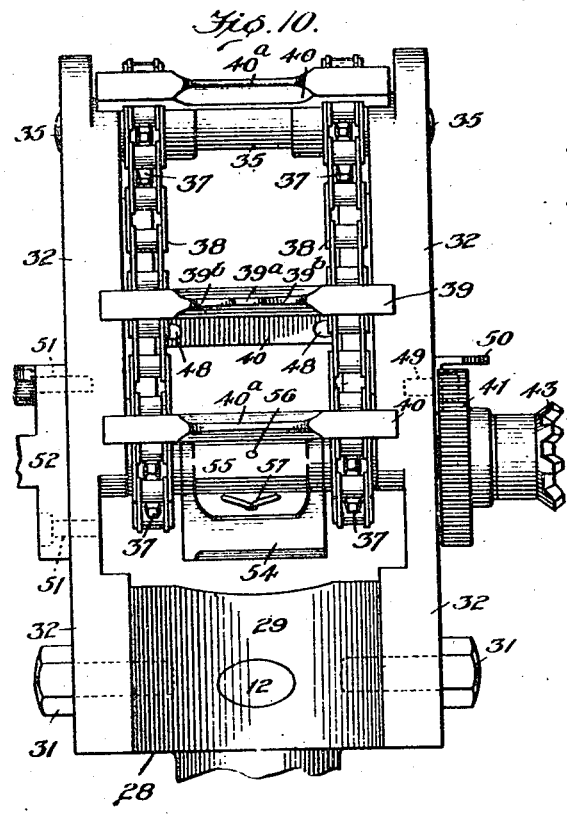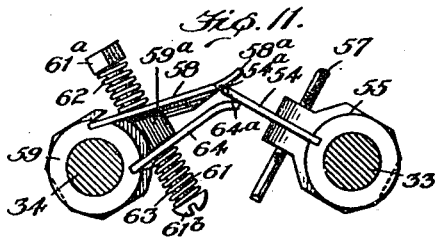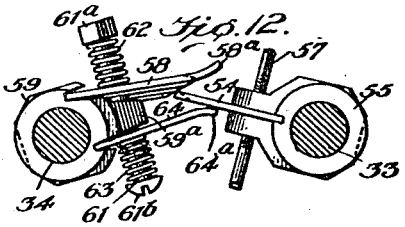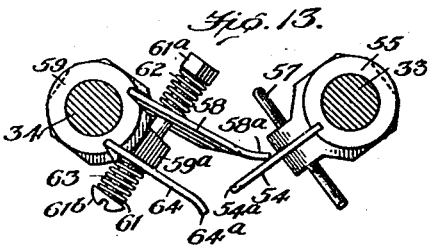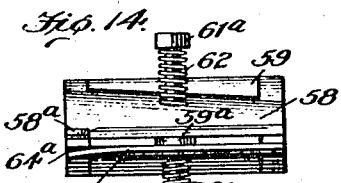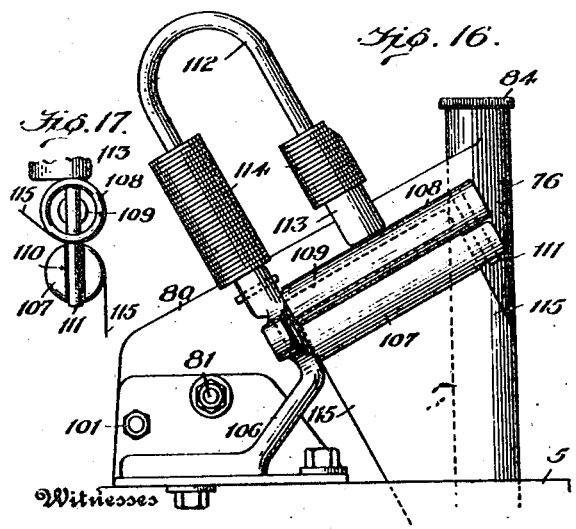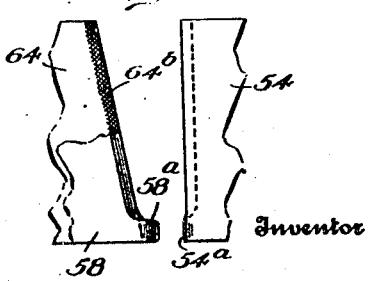

UNITED STATES PATENT OFFICE.

CLARENCE C. PAGE, OF GRANTS PASS, OREGON, ASSIGNOR TO THE NATIONAL WRAPPING MACHINE CORPORATION, OF NEWPORT, VERMONT.

WRAPPING-MACHINE.

1,290,027.     Specification of Letters Patent.      Patented Jan. 7, 1919.

Application filed May 28, 1915. Serial No. 30,941.

*To all whom it may concern:*

Be it known that I, CLARENCE C. PAGE, a citizen of the United States residing at Grants Pass, in the county of Josephine and State of Oregon, have invented certain new and useful Improvements in Wrapping-Machines; and I do hereby declare the following to be a full, clear, and exact description of the invention, such as will enable others skilled in the art to which it appertains to make and use the same.

My invention relates generally to the construction of machines which are designed to form an enveloping wrapper around articles of merchandise, but is especially and primarily directed to that type of wrapping machines in which the paper or other wrapper or cover is maintained in enveloping relation with the articles of merchandise by being twisted by means of suitable wrapper twisting mechanism.

It is the object of my present invention to simplify the construction of machines of the character indicated and to render them more durable and efficient in operation. This object is accomplished by combining and coördinating various elements of the apparatus in novel ways, as hereinafter specifically pointed out in the appended claims, the principal features of novelty stated in general terms, being as follows:

The wrapper severing mechanism involves the employment of a plurality of coöperating knives which are revoluble about a common axis and which are also movable toward the axis of rotation of the wrapper twisting means to engage and sever the wrapping material; the wrapping material is pressed against one of the knives in such manner as to be gripped and suitably held for severing by the knives; the delivery of the wrapped articles of merchandise from the machine is effected through communicating inclined chutes or surfaces down which the articles of merchandise gravitate after passing the twisting mechanism, one of said inclines being movable with the twisting mechanism; a plurality of devices are employed for applying tension to the wrapping material at independent points between which the wrapping material extends in a spiral direction and assumes a tubular form, one of said tension devices being intermittent in its operation; the means for twisting the wrapping material involves movable members which are adapted to engage the wrapping material at successively unequal intervals; and the wrapper twisting mechanism and movable devices for feeding the articles of merchandise are respectively actuated in a simple and effective manner through the instrumentality of vertically extending shafts one of which serves to drive the other. Further novel combinations of parts and features of elemental construction are pointed out in the claims.

In the drawings illustrating the invention,

Fig. 2 is a plan view of the machine, the cover or housing for a portion of the feed mechanism being broken away to disclose the movable parts.

Fig. 3 is a detail plan view of the upper bed plate of the frame of the machine and certain elements associated therewith.

Fig. 4 is a section on the line 4—4, Fig. 2.

Fig. 5 is a detail sectional view taken in the same plane as Fig. 4, but illustrating another position of the wrapper twisting and article feeding mechanisms.

Fig. 6 is also a detail sectional view taken in the same plane as Fig. 4, but illustrating still another position of the wrapper twisting and article feeding mechanisms.

Fig. 7 is a horizontal sectional view taken on the line 7—7, Fig. 6, the guard ring which covers certain devices for actuating the wrapper twisting mechanism being broken away.

Fig. 8 is a detail horizontal section showing the wrapper twisting position of a coöperating pair of one form of twister bars.

Fig. 9 is a view similar to Fig. 8, but showing another pair of coöperating twister bars.

Fig. 10 is a detail elevation of the wrapper twisting and wrapper severing mechanisms.

Figs. 11, 12 and 13 are detail views illustrating successive positions of the wrapper severing mechanism.

Fig. 14 is a detail elevation of a portion of the mechanism shown in Figs. 11, 12 and 13.

Fig. 15 is a detail plan view of a portion of the wrapper severing mechanism, one of the knives being broken away to disclose the plate which coöperates with the other knife to grip the wrapping material while it is being cut.

Fig. 16 is a detail elevation showing one of the devices for applying tension to the wrapping material.

Fig. 17 is an end view of the tension devices shown in Fig. 16.

Fig. 18 is a detail view, on the line 18—18 Fig. 4, showing certain of the devices for feeding the articles of merchandise.

Fig. 19 is a detail sectional view of a portion of the mechanism for feeding the articles of merchandise, the parts being in the position illustrated in Fig. 6 and the view being taken in a plane at right angles to that figure.

Fig. 20 is a detail section, taken in the plane of the line 20—20, Fig. 4.

Fig. 21 is a detail perspective view of one of the cams employed in the mechanism.

Fig. 22 is a detail plan view of the intermittently operating tension device.

Fig. 23 is a detail sectional view, taken in the plane of the line 23—23, Fig. 2.

Fig. 24 is an enlarged detail view of a portion of the construction shown in Fig. 23.

Figure 1:
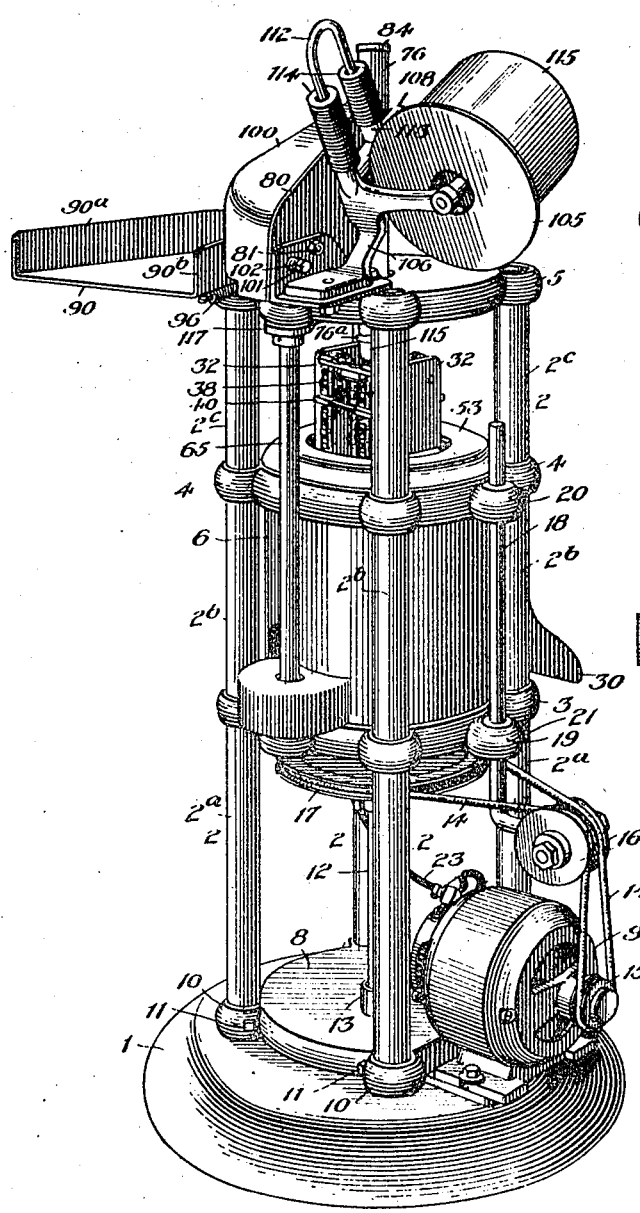
Figure 1 is a perspective view of a wrapping machine embodying my invention.

The improvements in wrapping machines herein described and claimed are disclosed as applied to a machine of the type and general construction of that described in my Patent Number 1,116,618, granted November 10, 1914, since the present improvements as applied to such a machine are especially advantageous. It is to be understood, however, that the particular form of the mechanism illustrated is not to be regarded as indicating the scope of my invention but is merely one concrete embodiment of the improvements claimed.

I will now proceed to describe my invention more fully, so that others skilled in the art to which it appertains may apply the same.

The frame of the machine is preferably constructed with a base 1 having a plurality of standards 2 extending vertically upward therefrom. These standards, for convenience of assembling the apparatus, may be formed as a series of tubular sections $2^a$, $2^b$, $2^c$ which serve to space apart and support the bed-plates 3, 4 and 5 which respectively serve as a support for the twister mechanism housing 6, a support or anchorage for the stationary worm 44 by which the belts of the twister mechanism are actuated, and a support or base for the devices for supplying the wrapping material, for feeding the articles of merchandise, and for applying tension to the wrapping material. Threaded rods $2^d$ which are provided with nuts extend through the tubular sections $2^a$, $2^b$ and $2^c$ and through corresponding apertures in the base 1 and supporting members 3, 4 and 5, thus rigidly uniting the several parts of the machine frame.

Mounted on the standards 2 adjacent to the base 1 is a bed-plate 8 to which is designed to be secured a suitable motor 9 for driving the movable parts of the mechanism. The bed-plate 8 is preferably provided with integrally attached collars 10 which are adapted to slide on the standards 2 and to be secured thereto in any desired position of vertical adjustment by means of set screws 11. As the vertically extending shaft 12 is supported at its lower end in a bearing 13 formed on the bed-plate 8 and as the wrapper twisting devices are mounted upon the upper end of said shaft, it will be seen that the wrapper twisting devices may thus be moved vertically to initially bring them into proper adjustment with the remainder of the mechanism and to compensate for any wear which may result from long service.

The shaft 12 is preferably driven by the motor 9 by means of a belt 14 which passes around the pulley 15 on the motor shaft, around a pair of similar angularly arranged pulleys 16 mounted on the machine frame, and around a pulley 17 which is preferably secured to the shaft 12 by a set screw so as to be adjustable vertically thereon. As shown in Fig. 1 the pulleys 16 are preferably journaled on an adjustable standard or bracket 18 which is slidably and rotatably mounted in collars 19 and 20 formed on the frame members 3 and 4, respectively. A set screw 21 which passes through the collar 19 serves to secure the bracket in any position of adjustment. By raising or lowering the standard 18 and correspondingly adjusting the pulley 17 the belt 14 may be put under the desired tension, and by rotating the standard 18 the pulleys 16 may be brought into correct operative alinement with the pulley 17. With this form of driving mechanism liability of the machine to injury as a result of clogging of the mechanism from any cause is eliminated, as, in the event of any such clogging the belt 14 will slip on the motor pulley 15, which is comparatively small. A switch 22, which is electrically connected to the motor 9 by a suitable cord or cable 23 and which may be mounted on the upper bed plate 5 of the frame within convenient reach of the operator, is preferably employed as a means for starting and stopping the mechanism.

Upward movement of the shaft 12 is preferably prevented by means of a collar 24 which is secured to said shaft by a set screw 25 and which bears at its upper end against a centrally located boss 26 formed on the under side of the intermediate bed plate or supporting casting 3 of the machine frame.

Surmounting the upper end of the shaft 12 and secured thereto, as for example by the pin or key 27, is a head 28 carrying the wrapper twisting mechanism. The wrapper twisting mechanism which is mounted on shaft 12, so as to be rotatable therewith, broadly stated involves movable endless devices in the nature of belts, preferably, though not necessarily, in the form of chain-belts as will hereinafter appear. This head has an inclined upper surface 29 down which the wrapped articles of merchandise gravitate and from which they pass to the stationary incline or delivery chute 30 that is preferably formed integral with the housing member 6. As shown more particularly in Figs. 4, 5 and 6, the upper end of the driving shaft 12 is inclined so as to conform to the inclined surface 29 and thus offer no obstruction to the passage of the wrapped articles of merchandise.

Extending upwardly from the head 28 and secured thereto by means of bolts 31 are oppositely disposed uprights 32 in which are journaled the parallel shafts 33, 34, 35 and 36, the shafts being arranged in pairs. The lower pair of shafts 33 and 34, are arranged near the lower ends of the uprights 32, while the upper pair, 35 and 36, are near the upper ends of the uprights. Each of the shafts 33, 34, 35 and 36 has two sprocket wheels 37, 37 secured to it, the arrangement being preferably such that the said sprocket wheels stand in close proximity to the said uprights or standards 32. Chain belts 38 pass around each vertically arranged pair of the sprocket wheels, and the chain belts that pass around sprocket wheels on the same shafts are connected by a series of bars 39 and 40, which are adapted to engage the wrapping material to cause the formation therein of twists which retain such wrapping material in enveloping relation with the articles of merchandise.

The upper pair of shafts, 35 and 36, are idlers which are driven by the sprocket wheels 37 thereon through the instrumentality of the chain belts 38. The shaft 34 is driven from the shaft 33 and in unison therewith by means of the engaging equal pinions 41 and 42, the former being keyed to the shaft 33 and the latter being similarly secured to the shaft 34. As a means for causing rotation of the shaft 33 it is preferred to rigidly secure to the outer end of said shaft a bevel gear 43 having teeth which are adapted to engage the internal teeth or threads of a stationary annular worm member 44 which may be conveniently mounted on the frame member 4 by having threaded engagement therewith, as shown, and which may be secured in its proper position of adjustment by means of oppositely disposed screws 45. The annular worm has upon its interior face right-handed threads having a cross-sectional form substantially like that of gear teeth, there being two teeth or threads per revolution. As the bevel gear 43, which is driven by this worm when the shaft 12 and attached head 28 revolve, has eight teeth it will be seen that the shaft 12 and head 28 on which the wrapper twisting and severing devices are mounted will make four complete revolutions for each single rotation of the shaft 33 and the shafts 34, 35 and 36 driven thereby. Each complete revolution of the shafts 33, 34, 35 and 36 corresponds to the complete wrapping of one article of merchandise.

The twister bars 39 and 40 are arranged alternately upon the chains 38, the respective distances from each bar to its adjacent bars being, as shown, made unequal to thereby permit the twisted ends of wrapping material projecting from the opposite sides of each wrapped article of merchandise to be regulated in length as may be desired without regard to the size of the articles that are being wrapped. In the present instance the distance between each bar 39 and the immediately succeeding bar 40 is equal to three links of the chains 38, while the distance between each bar 40 and the immediately succeeding bar 39 is equal to five links, the total distance from one twister bar 39 or 40, as the case may be, to the immediately succeeding twister bar of the same kind being eight links, which is equivalent to one complete revolution of the shafts 33, 34, 35 and 36 since the sprocket wheels 37 have eight teeth each. As will be noted, it results from this spacing of the twister bars that when the wrapping material is severed to free the wrapped articles from each other the free ends of the wrapping material will correspond in length to two and one-half links of the chain, while the space accorded to the article of merchandise equals three links of the chain. These proportions, however, while preferred, are not to be understood as essential.

As particularly shown in Fig. 8, the twister bars 39 are preferably formed with a raised central portion 39$^a$ and depressed or lower portions 39$^b$ at each side of such central portion, the result being that when two of the twister bars 39 come together in the operation of the machine the tube of paper or other wrapping material is gripped and crushed or flattened between the high parts 39$^a$ of the bars while the depressed portions 39$^b$ permit the wrapping material on each side to be drawn toward the center without tearing as the twister bars continue to pull the wrapping material downward and to twist the same. This effects a close twist in the wrapper. The bars 39 serve to make the twist in the wrapping material immediately in advance of the article of merchandise which is being wrapped.

The bars 40 operate upon the wrapping material to form the twist therein immediately behind the article which is being wrapped. As shown in Fig. 9 the outer faces of these bars are preferably depressed or of concave form, as at 40ª. This prevents the wrapping material from being gripped so tightly as to be restrained from slipping between the bars 40, yet at the same time causes the tube of wrapping material to be crushed inwardly and to be twisted behind the article of merchandise. As hereinbefore noted the twister bars 39 are so shaped as to grip and exert a pull on the wrapping material, while the twister bars 40 are so shaped as to permit the slipping of the wrapping material therethrough.

On reference to Figs. 5 and 6 of the drawings it will be noted that in the twisting operation the pair of twisting bars 39 are what may be termed the leader twister bars and the pair of twisting bars 40 may be termed the follower twister bars, and it will also be noted that between two pairs there is a short interval (see Fig. 6) which may be termed the wrapping pocket, while between the follower twister bars 40 and the succeeding leader twister bars 39 there is a long interval (see Fig. 5), in which intermediate space the knives that sever the wrapper operate. As the wrapping material is pulled downwardly and is twisted by the twister bars 39 the wrapper is drawn tightly around the article being wrapped and is twisted immediately behind it, the concave faces 40ª of the bars 40 permitting the requisite quantity of wrapping material to be drawn through them and to be pulled tightly around the articles of merchandise notwithstanding unequalities in the sizes of the latter.

In performing their wrapper twisting operations the ends of the bars 39 and 40 pass downwardly through vertical grooves or guideways 46 formed centrally in the inwardly projecting portions of the uprights or standards 32, and to support the chains 38 intermediate of the twister bars 39 and 40 supporting blocks or fillers 47 may, if desired, be secured to the inner faces of the uprights 32 so as to extend between each vertically arranged pair of sprocket wheels 37 within the space included by the corresponding chain belt 38.

As shown, especially in Figs. 8 and 9, the twister bars 39 and 40 are preferably notched near their outer ends to receive the chains 38. Pins 48, which are driven into the several corresponding bars 39 and 40 and which are preferably provided with lips or lugs that overlap adjacent links of the chains 38, may be conveniently adopted as a means for securing the said bars to the chain belts.
In order to protect the operator from possible injury it is preferred to secure to one of the uprights 32, as by means of a screw 49, a bracket 50 which extends outwardly over the meshing portions of the gears 41 and 42; and to the outer face of the opposite upright or standard 32 is preferably secured, as by means of screws 51, a block or weight 52 which serves to nicely balance the mechanism so as to permit it to revolve rapidly with the vertically extending driving shaft 12 without any substantial vibration. A ring or annulus 53 which rests upon the stationary member 4 of the machine frame and which serves not only to further protect the operator against possible injury, but also to prevent foreign bodies from accidentally falling into the machine at this point, may also be employed if desired.

The knife mechanism by which the wrapping material is severed to free the wrapped articles from each other preferably consists of a pair of coöperating knives which operate in the space between the chains 38, one of said knives being mounted on the shaft 33 and the other being mounted on the adjacent shaft 34.

The knife 54 carried by the shaft 33 is preferably rigidly secured to said shaft. To this end it is preferred to mount upon the shaft 33 between the corresponding chains 38 a sleeve 55 which is secured to said shaft by means of a pin 56, the sleeve 55 being formed with a slot adapted to receive the knife 54. A cotter pin 57, which passes through the knife 54 and its sleeve or shaft-mounting 55, may conveniently serve to retain the knife in assembled position. The cutting edge of the knife 54 is preferably parallel to the shaft 33.
The knife 58 which coöperates with the stationary knife 54 is yieldingly mounted on the shaft 34 and has its cutting edge arranged at an angle to the axis of said shaft and to the cutting edge of the knife 54 so that the wrapping material is severed by a shearing cut when the knives 54 and 58 pass each other, as indicated in Figs. 6, 11, 12 and 13. In yieldingly mounting the knife 58 on the shaft 34 it is preferred to rigidly secure to the latter a sleeve 59 having a seat in which the knife rests with capability of oscillation to the desired extent, said sleeve 59, which may be secured to its shaft by means of a pin 60, being also preferably provided with a radially extending lug 59ª which serves as a stop to limit the movement of the knife 59 in one direction. Passing through the lug 59ª and through a suitable hole in the knife 58 is a bolt 61 that is encircled by two springs 62 and 63, respectively, one of said springs being interposed between the knife 58 and the nut 61ᵇ on the bolt and the other being similarly arranged between the head 61ᵇ of the bolt and a plate 64 which, as will hereinafter appear, coöperates with the under side of the stationary knife 54 to yieldingly grip the wrapping material and prevent it from slipping laterally along the knives as their cutting edges shear along each other during the wrapper severing operation. As will be readily understood, the spring pressure on the knife 58, and on the plate 64 as well, may be regulated to any desired degree by means of the bolt 61. The leading corner of the knife 58 is provided with a vertically curved tongue or projection 58ᵃ, as particularly shown in Figs. 11 to 15, inclusive, such projection, by engaging with the corner 54ᵃ of the knife 54, thus insuring that the stationary knife 54 shall pass under the yielding knife 58 in performing the shearing operation. The knives, as shown more especially in Fig. 6, are preferably so located on their respective shafts 33 and 34 that they sever the wrapping material midway between successive wrapped articles.

The plate 64 may be mounted in the same manner and is substantially of the same form as the knife 58, saving only that no projecting lug corresponding to the lug 58ᵃ is ordinarily formed upon it. Its leading corner 64ᵃ is, however, preferably slightly curved vertically in a direction opposite to the curvature of the lug 58ᵃ, to thereby insure the entry of the stationary knife 54 between the plate and the yielding knife 58. Adjacent to the edge of the plate and on the side toward the knife 58 said plate 64 is preferably provided with a roughened or knurled surface 64ᵇ between which and the adjacent side of the stationary knife 54 the wrapping material is pressed and thus yieldingly gripped during the cutting operation of the two knives, the roughening or knurling of the surface serving to more efficiently prevent the wrapping material from slipping. As will be readily understood, the severing of the wrapping material is rendered more certain by providing means for holding it at a point below the cutting edges of the knives during their cutting operation, since should the wrapping material be free at its lower end the knives, instead of shearing the material, might simply push or drive it along their cutting edges without severing it.

The plunger 75 which reciprocates in the tube around which the wrapping material is formed and the devices by which the articles of merchandise are delivered into the tube are preferably actuated by a shaft 65 which extends parallel with the principal driving shaft 12. The shaft 65 is driven from the shaft 12 so as to make one revolution for each four revolutions of said shaft 12, such movement corresponding, in the special case illustrated in the drawings, to a movement of the chains 38 equal to eight links thereof or to the complete wrapping of a single article of merchandise. The shaft 65 may be conveniently driven from the shaft 12 by a train of gearing (see Fig. 4), a pinion 66 being secured to the shaft 12, a pinion 67 being secured to the shaft 65 and intermediate pinions 68 and 69, which respectively mesh with the pinions 66 and 67, being carried on a shaft 70 that is mounted in the stationary casting 3 of the machine frame. These several gears are inclosed by the housing 6 and lie below the inclined chute 30 thereof.

The lower end of the shaft 65, which may be lubricated through an oil duct 71, is preferably stepped in a bearing member 72 which has threaded engagement with the intermediate bed member 3 of the machine frame, the shaft 65 being thus rendered capable of vertical movement to effect an accurate positioning of the cam 73 which is mounted on the upper end of said shaft above the upper bed plate 5. A pin 74 may be employed for rigidly securing the cam 73 to the shaft 65.

As viewed from above the direction of rotation of the cam 73 is counter-clockwise. The portion of the cam extending from $a$ to $b$ (see Figs. 4 and 21) corresponds to the highest upward movement of the plunger 75 within the tube 76 and to the article feeding movement of the pivoted spoon or ejector member 77 toward said tube; the portion of the cam between the points $b$ and $c$ corresponds to a movement of the ejector member 77 away from the tube 76 and to a downward movement of the plunger 75, whereby the latter is enabled to follow downwardly within the tube of wrapping material behind the article of merchandise immediately theretofore fed into the tube 76, thus insuring that the article of merchandise shall reach its proper position within the tube of wrapping material. The position of the plunger 75 corresponding to the point $c$ is illustrated in full lines in Fig. 5.

The succeeding portion of the cam between $c$ and $d$ corresponds to a short upward excursion of the plunger 75 to the position indicated in dotted lines in Fig. 5, such retraction of the plunger being for the purpose of permitting the pairs of coöperating twister bars 40 to clear the lower end of the plunger and move inwardly without interference behind the article of merchandise, to thereby engage and crush the tube of wrapping material and induce a twisting of the latter to the rear of the article that is being wrapped. The final portion of the cam, namely, between the points $d$ and $a$, corresponds to the downward movement of the plunger 75 to the position shown in Fig. 6, which is the lowest position of the plunger. By this downward movement of the plunger in close proximity to the twister bars 40 and within the tube of wrapping material the twist in the wrapping material is substantially confined to the space between the twister bars and the lower end of the plunger 75 and is thus rendered somewhat tighter than it otherwise would be. During the succeeding upward movement of the plunger 75, and before the pivoted ejector member 77 delivers another article of mechandise into the tube 76, the next pair of twister bars 39 engage and crush the tube of wrapping material between them, so that when the article of merchandise is delivered into the tube 76, which preferably occurs at substantially the same time, said article will drop through the tube 76 and pass into the tube of wrapping material, passing downwardly therein until arrested by the twist in the wrapping material effected by the co-acting bars 39. These operations are repeated for each article of merchandise that is wrapped by the machine.

The movements of the plunger 75 are preferably effected through a pivoted lever 78 which is flexibly connected to said plunger by means of a link 79 that is pivotally connected to said lever and plunger. The lever 78 is pivotally mounted on the upwardly extending stationary plate 80 of the machine frame by means of a pivot pin or stud 81 that is carried by the latter and is preferably formed with a comparatively long sleeve or bearing 78ᵃ which encircles the pivot pin 81 and by affording an extended bearing prevents undesirable lateral movements of the lever as it oscillates up and down in actuating the plunger 75. The lever 78 is also provided with a laterally projecting stud bearing a roller 82 which traverses the operative face of the cam 73, said roller being maintained in constant engagement with the cam by means of a spring 83 which is connected at one end to the short arm of said lever and at the other end is anchored to the plate 80 by means of a suitable stud or pin. As shown more particularly in Figs. 4, 5, 6, 18 and 20, the tube 76 and the upper, hollow portion of the plunger 75 are preferably slotted vertically to permit the entrance of the cam lever 78, the link 79 being pivoted to the end of said lever and to the upper end of said plunger within the tubular portion of the same. The upper end of the tube 76 may be closed by a threaded plug 84 to prevent any foreign body from accidentally getting into this portion of the machine.

Figures 28, 29:
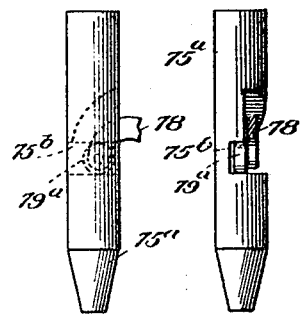
Figs. 28 and 29 are detail views, taken at right angles to each other, showing a modified form of plunger and its operating mechanism.

Another convenient mode of operating the plunger is illustrated in Figs. 28 and 29. In this form of construction a roller 79ᵃ which is mounted upon the end of the cam lever 78 is employed in lieu of the link 79, and the plunger 75ᵃ is formed as a solid member which is provided with a transversely extending slot 75ᵇ forming faces to engage the opposite sides of the roller, the plunger, as shown, being shaped to receive and permit the oscillations of the end of the lever 78.

For the sake of simplicity of construction the ejector 77 by which the articles of merchandise are delivered into the tube 76 is preferably operated by the cam lever 78 which controls the movements of the plunger 75. To this end the lever 78 may be provided with a roller 85 which is adapted to engage and actuate the ejector 77 to thereby cause the latter to perform its operation of delivering the article of merchandise to the wrapping mechanism at the proper predetermined intervals. The ejector 77, which is pivotally mounted upon the stationary plate 80 by means of a stud or pin 86, is provided with two arms 77ᵃ and 77ᵇ, respectively, between and upon which the roller 85 operates in causing the ejector 77 to oscillate back and forth upon its pivot in conformity to the extended oscillations of the cam lever 78. When the lever 78 moves upwardly in passing to the position illustrated in Fig. 4 the roller 85 thereon passes between the arms 77ᵃ and 77ᵇ and, by engaging the former causes the ejector 77 to turn on its pivot and move toward the tube 76 into which the article of merchandise is delivered. Upon the downward movement of the lever 78 the roller 85 engages the arm 77ᵇ and forces the lower end of the ejector 77 rearwardly, as indicated in Figs. 5 and 6, to a position where it is again ready to repeat its operation of pushing an article of merchandise into the tube 76. In the intervals when the roller 85 is moving from one to the other of the arms 77ᵃ and 77ᵇ the ejector 77 remains at rest, the feeding of successive articles of merchandise into the tube 76 being thus enabled to be so timed as to avoid all possibility of interference with the plunger 75 which reciprocates within said tube.

That portion of the ejector which comes in contact with the articles of merchandise is preferably curved concavely, as indicated at 77ᶜ, somewhat in the fashion of a spoon, such a construction serving to assist in centralizing the articles of merchandise in the chute or trough 87 in which they rest and through which they are delivered to the tube 76. As shown more particularly in Fig. 26, the ejector 77 is preferably frictionally held on its pivot pin 86, in any position which the roller 85 may cause it to assume, by means of a spring 88 which bears upon the plate 80, and also upon the ejector 77, said spring encircling the cylindrical sleeve of the ejector through which the pivot stud 86 passes. To the more certainly insure that the injector 77 shall not, in the rapid operation of the machine, be thrown or swung rearwardly to such an extent as to prevent the roller 85 in its upward movement from properly engaging the under side of the arm 77$^a$, a laterally projecting stop 88 (see Fig. 4) is preferably secured to the stationary plate 80 in such position as to prevent undue rearward movement of the ejector.

Figure 25:
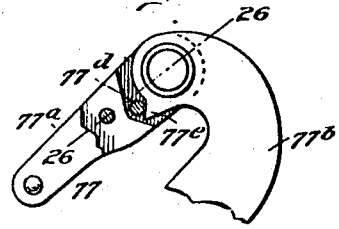
Fig. 25 is a detail view in elevation of a portion of the mechanism for feeding the articles of merchandise.
Figure 26:
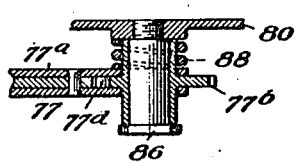
Fig. 26 is a sectional view, taken in the plane of the line 26—26, Fig. 25.

In the normal operation of the mechanism the arms 77$^a$ and 77$^b$ of the ejector 77 have no movement with respect to each other and the ejector operates as if it were an integral member. In order, however, to provide for a relative yielding movement of the arms 77$^a$ and 77$^b$ such as would permit the arm 77$^b$ to remain stationary while the roller 85 executes its normal movement, which contingency might be necessary to prevent breaking of or injury to this part of the mechanism should any unduly large body accidentally drop or be attempted to be fed into the machine, it is preferred, as shown in Figs. 25 and 26, to form the arms 77$^a$ and 77$^b$ as separate members which are hinged together around the pivot stud 86, the movement of said arms with respect to each other being limited by the coöperation of a pin or stop 77$^d$ on the arm 77$^a$ and a stop or shoulder 77$^e$ on the arm 77$^b$. A comparatively strong spring 89, which is attached at opposite ends to the respective arms 77$^a$ and 77$^b$ serves to normally maintain the stops 77$^d$ and 77$^e$ in contact with each other, thus causing the ejector 77 to normally operate as if it were an integral member.

The articles of merchandise which are to be wrapped are preferably deposited on a table 90 from which they are fed one at a time to the wrapping mechanism. This feed table is preferably provided with marginal flanges 90$^a$ and 90$^b$ which serve to prevent the articles of merchandise from being accidentally displaced from the table, said flanges being interrupted or having an opening between them adjacent to the trough 87 so that the articles to be wrapped may be delivered from said table into said trough. The straight rear edge of the feed table 90 is, as shown, preferably unprovided with any marginal flange. The omission of the flange at this point permits the feed table of the machine to be conveniently placed in contact with the edge of any ordinary table upon which large quantities of the unwrapped articles of merchandise may be deposited, the articles being supplied from time to time to the feed table 90 as occasion may demand.

Adjacent to the opening between the flanges 90$^a$ and 90$^b$ the feed table 90 is preferably formed with a circular or cup-like depression 90$^c$ within which a pocketed feed wheel 91 is rotatably mounted on a vertical shaft 92 that has threaded engagement with the feed table 90 and the underlying bed plate 5. The feed wheel 91 rotates in a step by step manner, each step of the rotation corresponding to the delivery of an article of merchandise into the feed chute 87 and in front of the ejector 77. As the chute 87 is somewhat lower than the bottom of the depression 90$^c$ in the feed table 90, and as the sloping wall of said depression is cut away at 90$^d$ (see Fig. 2) so as not to offer any obstruction to the passage of the articles of merchandise through the opening between the flanges 90$^a$ and 90$^b$ of the feed table, the articles of merchandise gravitate one by one from the several pockets in the feed wheel 91 into the trough or chute 87 as the respective pockets come into juxtaposition with the opening between the marginal flanges of the feed table. As shown more particularly in Figs. 5 and 6 the bottom of the chute 87 preferably slopes or is curved upwardly toward the tube 76, thus overcoming any tendency of the article of merchandise to accidentally roll or slide toward said tube.

As a convenient means of rotating the feed wheel 91 step by step said wheel may be provided with a series of regularly spaced circularly arranged pins 93 which project downwardly from the under surface thereof. The pins correspond in number to the number of pockets in the feed wheel. Just below the cam 73 is an eccentric 94 on the shaft 65. This eccentric, which is preferably secured to the cam by means of pins 94$^a$, passes through a corresponding circular opening in a horizontally extending drag pawl 95 which is provided at its free end with a hooked portion 95$^a$ that is adapted to successively engage the several pins 93 which project downwardly from the under side of the feed wheel 91, to thereby intermittently rotate the latter. A spring 96, which is attached at one end to the feed table 90 and at the other end to a short arm or projection 95$^b$ formed on the pawl 95 adjacent to the eccentric 94, serves to insure the driving engagement of the hooked end 95$^a$ of the pawl with the pins 93 and likewise permits said pawl to yield laterally so that its hooked end may ride over or past the pins and successively come into driving engagement with each of them.

In order to prevent the feed wheel 91 from turning backwardly a pin or stop 97 may be mounted on the table 90 so as to project upwardly in the line of travel of the pins 93 a short distance above the bottom of the depression 90$^c$ in which the feed wheel turns. As shown in Figs. 23 and 24 the faces of the pins 93 and that of the stop 97 are so beveled that the pins 93 may ride over the corresponding inclined face of the stop 97 when the feed wheel, which is freely movable vertically on its shaft 92, is turned in one direction, but cannot pass the stop to permit the feed wheel to rotate in the opposite direction.

The feed table 90 may be conveniently secured to the upper bed plate 5 of the machine by means of the shouldered shaft 92 which has threaded engagement with said bed plate, a pin 98 which extends into a hole 99 in said bed plate serving to properly position the feed table.

As shown in Figs. 1, 2 and 4 a housing 100 may be employed to protect the operator from contact with the cam 73, lever 78, ejector 77 and their adjacent associated parts. This housing, when employed, is preferably hinged to and beside the stationary plate 80 by means of a bolt 101 which passes through the plate 80 and has threaded engagement with the housing member. A spring 102 which encircles the bolt and is interposed between the head thereof and the plate 80 serves to hold the housing 100 in position and prevents rattling, while pins 103 and 104 projecting laterally from the stationary plate 80 serve as stops to respectively determine the raised and lowered position of said housing.

Figure 27:
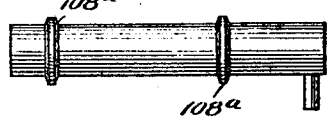
Fig. 27 is a view of a modified form of cylinder forming a part of one of the tension devices.

The reel 105 upon which the roll of paper or other wrapping material is mounted, is preferably journaled on a bracket 106 which is bolted to the upper bed plate 5 of the machine frame. The bracket 106 is also availed of as a means of supporting a tension device for continuously applying tension to the web of wrapping material before it passes spirally downward around the tube 76. This tension device preferably consists of a pair of adjacent cylinders or spools between which the wrapping material passes, the lower cylinder, 107, being rigidly mounted on the bracket 106, and the upper cylinder, 108, being hollow and threaded on a rod or finger 109 which projects from said bracket above and parallel to the lower cylinder or spool 107. To prevent rotation of the upper cylinder 108 when the wrapping material is drawn between it and the lower cylinder the latter is preferably slotted at its outer end, as at 110, to receive a downwardly projecting rod or bar 111 that is mounted on and extends transversely of the upper cylinder at its outer end. When the upper cylinder 108 is slipped upon the rod 109 the bar 111 enters the slot 110 in the outer end of the lower cylinder (see Fig. 17) and said upper cylinder is thus prevented from turning. It is preferred to make the upper cylinder or spool 108 of this tension device of indurated fiber or similar material, but it may be of metal if desired. When made of metal it is preferred to fashion such spool with projecting annular ribs 108$^a$, as shown in Fig. 27; otherwise the upper tensioning spool, if made of metal, is preferably precisely the same as heretofore described.

The upper cylinder 108 is caused to bear downwardly on the web of wrapping material passing between it and the lower cylinder 107 to impart the desired tension by applying pressure to the upper cylinder. This may be advantageously accomplished by securing to the bracket 106 an inverted U-shaped rod or guide 112 one end of which terminates just above the upper cylinder 108 of the tensioning device. Slidably mounted on the rod 112 are a series of annular weights which may be moved thereon so as to impose the weight of any desired number of them on the upper tensioning cylinder 108, the tension on the web of wrapping material passing between the cylinders thus being capable of effective and positive maintenance at a uniform degree and being capable of facile adjustment. With the exception of the annular weight 113 which directly bears upon the cylinder 108, the weights 114 of the tensioning device are preferably thin, as the degree of tension applied to the web of wrapping material may be thereby adjusted with greater nicety. The height of the annular weight 113, however, is preferably made such that the guide rod 112 will project into said weight when the latter is resting on the cylinder supporting finger 109, the retention of the adjustable weights in assembled position on their guide 112 being thus at all times assured.

The cylinders 107 and 108 are arranged close to and parallel with the plate 80, which latter is preferably tangent to the tube 76 and brazed or otherwise integrally attached to said tube so as to support the same. The web of wrapping material after leaving the spools of the tensioning device passes downwardly beside the plate 80, which thus supports it laterally and prevents it from becoming accidentally torn or wrinkled at this point. The wrapping material, which is indicated by the reference numeral 115, is caused to assume a tubular form by passing spirally downward around the tube 76 through which the articles of merchandise are fed to the wrapping mechanism, the spiral direction or form of the web of wrapping material resulting in leaving uncovered the lateral aperture through which the articles of merchandise gain entrance to the tube 76. Just below the upper bed plate 5 and bolted to the under side thereof it is preferred to provide a curved guide (see Figs. 4, 18 and 19) 116 over the edge of which adjacent to the tube 76 the wrapping material passes; and at its lower end the tube 76 is preferably slotted to provide a tongue 76$^a$ which, by projecting outwardly between overlapping portions of the spirally extending web of wrapping material, permits the tube of wrapping material to be most effectively and completely closed as it leaves the end of the feed table 76. The guide 116 and the tongue 76ª both assist in causing the wrapping material to closely conform to the tube 76 as it passes spirally downward around the latter in the direction of rotation of the wrapper twisting mechanism.

A further tension device, which is adapted to apply tension to the web of wrapping material at a point adjacent to the lower end of the tube 76, is also preferably employed. This device is designed to intermittently act upon the web of wrapping material, applying tension thereto during the period substantially corresponding to the interval between the engagement of a pair of coacting twister bars 40 with the tube of wrapping material and the engagement of the succeeding pair of coacting twister bars 39 therewith. By thus applying tension to the wrapping material after a pair of twister bars 40 close in behind an article of merchandise, the wrapping material is drawn more tightly and snugly around the article and the twist in the material is also caused to be more tightly made, while by releasing this tension as a coacting pair of twister bars 39 come into engagement with the tube of wrapping material the wrapping material is permitted to be freely and quickly drawn off the tube 76 in such quantity as may be required to form the enveloping pocket for the article of merchandise.

The device for thus intermittently applying tension to the wrapping material above the wrapper twisting mechanism preferably consists of a horizontally extending reciprocating member 117 which lies just beneath the upper bed plate 5 of the machine and which is yieldingly connected to said bed plate by means of a tension spring 118, the member 117 being conveniently provided with a series of downwardly projecting pins 119 to either of which the end of the spring 118 may be attached to thereby regulate the tension imparted to the wrapping material. The end of the member 117 which is adjacent to the tube 76 is curved to correspond generally to the curvature of the tube and is provided with an inserted friction shoe or facing 120 which is preferably of leather and which may be secured to said member 117 by means of pins or screws. In order to support the tension device 117 at a point adjacent to the tube 76 while at the same time permitting it to move toward and from the tube, a slot 121 may be formed in the end of said member 117 for receiving a bolt 122 which has threaded engagement with the upper bed plate 5 of the machine frame, a washer 123 being interposed between the head of the bolt and the tension device. As shown in Figs. 4 and 22 the movements of the tension device 117 are controlled by a cam 124 which may be secured to the rotatable shaft 65 by a set screw. The cam 124 rotates in a circular opening or eye formed in the tension member 117 at its outer end, the shape of the cam being such that the spring 118 is permitted to draw the friction shoe 120 toward the tube 76 periodically, as heretofore explained, to thereby press the wrapping material against the tube 76 and thus apply tension to said wrapping material.

What I claim is:

1. In a wrapping machine, the combination with means for supplying the wrapping material and means for feeding the articles of merchandise to be wrapped, of means for twisting the wrapping material to retain it in enveloping relation with the articles of merchandise, said twisting means being mounted on a vertical adjustable revoluble shaft, and means for vertically adjusting said revoluble shaft.

2. In a wrapping machine, the combination with means for supplying the wrapping material, of means for feeding the articles of merchandise which are to be wrapped, revoluble means for twisting the wrapping material to retain it in enveloping relation with the article of merchandise, and means for severing the wrapping material, said wrapper severing means being revoluble with the wrapper twisting mechanism and involving a plurality of knives which are movable toward the axis of rotation of said wrapper twisting means to engage and sever said wrapping material.

3. In a wrapping machine, the combination with means for supplying the wrapping material, of means for feeding the articles of merchandise which are to be wrapped, means for twisting the wrapping material to retain it in enveloping relation with the articles of merchandise, and a plurality of knives for severing said wrapping material, said knives being revoluble about a common axis and being also simultaneously and continuously revoluble about independent axes.

4. In a wrapping machine, the combination with means for supplying the wrapping material, of means for feeding the articles of merchandise which are to be wrapped, means for twisting the wrapping material to retain it in enveloping relation with the articles of merchandise, and means for severing the wrapping material, said wrapper twisting means involving movable endless devices and driving shafts therefor, and said means for severing the wrapping material involving a plurality of coöperating knives which are mounted upon said shafts and are adapted to pass between said belts.

5. In a wrapping machine, the combination with means for supplying the wrapping material, of means for feeding the articles of merchandise which are to be wrapped, means involving movable endless devices for twisting the wrapping material to retain it in enveloping relation with the articles of merchandise, and means for severing the wrapping material, said means for severing the wrapping material involving knife mechanism operating between said movable endless devices.

6. In a wrapping machine, the combination with means for supplying the wrapping material, of means for feeding the articles of merchandise which are to be wrapped, means for twisting the wrapping material to retain it in enveloping relation with the articles of merchandise, a plurality of coöperating knives for severing the wrapping material, and means for pressing said wrapping material against one of said knives to thereby grip the wrapping material during the severing operation.

7. In a wrapping machine, the combination with means for supplying the wrapping material, of means for feeding the articles of merchandise which are to be wrapped, means for twisting the wrapping material to retain it in enveloping relation with the articles of merchandise, means for severing the wrapping material, and means for gripping the wrapping material adjacent to its point of severance and between the wrapped article and such point of severance.

8. In a wrapping machine, the combination with means for supplying the wrapping material, of means for feeding the articles of merchandise which are to be wrapped, means for twisting the wrapping material to retain it in enveloping relation with the articles of merchandise, a plurality of relatively movable knives for severing the wrapping material, and a paper engaging device arranged adjacent to one of said knives and adapted to press the wrapping material against another of said knives, said last named knife and said paper engaging device being adapted to yieldingly engage each other.

9. In a wrapping machine, the combination with means for supplying the wrapping material, of means for feeding the articles of merchandise which are to be wrapped, means for twisting the wrapping material to retain it in enveloping relation with the articles of merchandise, a plurality of knives revoluble on independent axes for severing the wrapping material, and a device adapted to press the wrapping material against one of said knives, said device being revoluble on the same axis with and yieldable with respect to one of said knives, and the knife against which it presses the wrapping material being adapted to cause a separation of the said device and the adjacent knife with which it revolves.

10. In a wrapping machine, the combination with means for supplying the wrapping material, of means for feeding the articles of merchandise which are to be wrapped, means for twisting the wrapping material to retain it in enveloping relation with the articles of merchandise, a plurality of relatively movable knives for severing the wrapping material, and a plate having a roughened portion which is adapted to press the wrapping material against one of said knives.

11. In a wrapping machine, the combination with means for supplying the wrapping material, of means for feeding the articles of merchandise which are to be wrapped, means for twisting the wrapping material to retain it in enveloping relation with the articles of merchandise, and a revolving head upon which said means for twisting the wrapping material is supported, said revolving head having an inclined portion for conveying the wrapped articles from the said means for twisting the wrapping material.

12. In a wrapping machine, the combination with means for supplying the wrapping material, of means for feeding the articles of merchandise which are to be wrapped, revoluble means for twisting the wrapping material to retain it in enveloping relation with the articles of merchandise, a member revoluble with said means for twisting the wrapping material and having an inclined portion for conveying the wrapped articles, and a stationary member having an inclined surface upon which the wrapped articles are delivered from said revoluble inclined member.

13. In a wrapping machine, the combination with means for supplying the wrapping material, of means for feeding the articles of merchandise which are to be wrapped, means for forming the wrapping material to retain it in enveloping relation with the articles of merchandise, a movable member having an inclined surface over which the wrapped articles pass, and a stationary member having an inclined surface over which the wrapped articles pass after leaving said movable inclined surface.

14. In a wrapping machine, the combination with means for supplying the wrapping material, of means for feeding the articles of merchandise which are to be wrapped, means for forming the wrapping material to retain it in enveloping relation with the articles of merchandise, and relatively movable inclined surfaces over which the wrapped articles are delivered.

15. In a wrapping machine, the combination with means for supplying the wrapping material, of means for feeding the articles of merchandise which are to be wrapped, a vertically extending revoluble shaft, a pulley secured to said shaft for driving the same, and means rigidly mounted upon the upper end of said shaft for twisting the wrapping material to retain it in enveloping relation with the articles of merchandise.

16. In a wrapping machine, the combination with means for supplying the wrapping material, of means for feeding the articles of merchandise which are to be wrapped, means for twisting the wrapping material to retain it in enveloping relation with the articles of merchandise, a shaft for actuating the means for twisting the wrapping material, the twisting mechanism being mounted on said shaft, and a shaft for actuating the means for feeding the articles of merchandise, said shafts being parallel.

17. In a wrapping machine, the combination with means for supplying the wrapping material, of means for feeding the articles of merchandise which are to be wrapped, means for twisting the wrapping material to retain it in enveloping relation with the articles of merchandise, and a plurality of parallel shafts revoluble at different speeds, one of said shafts serving to support and actuate the means for twisting the wrapping material, and one of said shafts serving to actuate the means for feeding the articles of merchandise.

18. In a wrapping machine, the combination with means for supplying wrapping material, of means for feeding the articles of merchandise which are to be wrapped, means for twisting the wrapping material to retain it in enveloping relation with the articles of merchandise, a vertically extending revoluble shaft upon which said means for twisting the wrapping material is mounted, and a vertically extending revoluble shaft driven by said shaft first named and operating to actuate said means for feeding the articles of merchandise.

19. In a wrapping machine, the combination with a tubular member into which and from which the articles of merchandise which are to be wrapped are adapted to pass and around which the wrapping material passes spirally, of a device for applying tension to said wrapping material in advance of its spiral passage around said tubular member, and a device for applying tension to said wrapping material at a point where it passes spirally around said tubular member.

20. In a wrapping machine, the combination with a tubular member into which and from which the articles of merchandise which are to be wrapped are adapted to pass and around which the wrapping material passes spirally, of a device for applying tension to the wrapping material in advance of its spiral passage around said tubular member, and a device for intermittently applying tension to said wrapping material at a point where it passes spirally around said tubular member.

21. In a wrapping machine, the combination with means for causing the wrapping material to extend spirally to form a tube, of a plurality of devices for applying tension to the wrapping material at independent points between which the wrapping material assumes the said tubular form, and means for causing the wrapping material to envelop the articles of merchandise which are to be wrapped.

22. In a wrapping machine, the combination with means for causing the wrapping material to extend spirally in tubular form, of a plurality of devices for applying tension to the wrapping material at independent points between which the wrapping material assumes said spiral form, and means for causing the wrapping material to envelop the articles of merchandise which are to be wrapped, one of said devices for applying tension to said wrapping material operating intermittently.

23. In a wrapping machine, the combination with means for supplying the wrapping material and means for feeding the articles of merchandise to be wrapped, of means for twisting the wrapping material to retain it in enveloping relation with the article of merchandise, said means including a plurality of twisting devices arranged at intervals on a traveling member, and means for causing the feeding means to deliver the articles of merchandise to the alternate intervals between the twisting devices.

24. In a wrapping machine, the combination with means for supplying the wrapping material and means for feeding the articles of merchandise to be wrapped, of means for twisting the wrapping material to retain it in enveloping relation with the articles of merchandise, said means including traveling devices provided at intervals with twisting bars, and means for causing the feeding means to deliver the articles of merchandise to the alternate intervals between the twisting bars.

25. In a wrapping machine, the combination with means for supplying the wrapping material, of a tubular member into which and from which the articles of merchandise which are to be wrapped are adapted to pass, a plunger reciprocating within said tubular member and having a tapered portion which is adapted to project from said tubular member and to engage said wrapping material, and means for twisting the wrapping material to retain it in enveloping relation with the articles of merchandise.

26. In a wrapping machine, the combination with means for supplying the wrapping material, of a tubular member into which and from which the articles of merchandise which are to be wrapped are adapted to pass, and means for twisting the wrapping material to retain it in enveloping relation with the articles of merchandise, said tubular member being formed with a slot into which the wrapping material extends.

27. In a wrapping machine, the combination with means for supplying the wrapping material, of means for feeding the articles of merchandise which are to be wrapped, and means for forming the wrapping material to retain it in enveloping relation with the articles of merchandise, said means for feeding the articles of merchandise involving an intermittently rotating feed wheel which is mounted on a vertical axis and which is provided with pockets for receiving the articles of merchandise, a trough to which the articles of merchandise pass from said feed wheel, and intermittently movable means for forcing the articles of merchandise from said trough.

28. In a wrapping machine, the combination with means for supplying the wrapping material, of means for feeding the articles of merchandise which are to be wrapped, and means for forming the wrapping material to retain it in enveloping relation with the articles of merchandise, the means for feeding the articles of merchandise involving a feed table having a depression for the feed wheel and a chute leading therefrom, a feed wheel rotatable in said depression of the feed table, an ejector for delivering the article from the chute to the wrapping material, and a plunger for insuring the proper position of the article in the wrapper.

29. In a wrapping machine, the combination with means for supplying the wrapping material, of means for feeding the articles of merchandise which are to be wrapped, and means for forming the wrapping material to retain it in enveloping relation with the articles of merchandise, said means for feeding the articles of merchandise involving a chute and a feed table communicating therewith, said feed table being formed with a depression for the reception of the feed wheel and being provided with a flange which is interrupted adjacent to said chute to permit the articles of merchandise to pass by gravity from said table to said chute, and a pocketed feed wheel rotatably mounted in said depression.

30. In a wrapping machine, the combination with means for supplying the wrapping material, of means for feeding the articles of merchandise which are to be wrapped, and means for twisting the wrapping material to retain it in enveloping relation with the articles of merchandise, said means for feeding the articles of merchandise involving a pocketed feed wheel which is intermittently rotatable, a trough in juxtaposition to said feed wheel and which is adapted to support the articles of merchandise delivered from said feed wheel, and intermittently movable pivoted means for forcing the articles of merchandise from said trough.

31. In a wrapping machine, the combination with a frame, of means mounted thereon for supplying the wrapping material, means for feeding the articles of merchandise which are to be wrapped, a vertically extending rotatable shaft, means mounted on said shaft for twisting the wrapping material to retain it in enveloping relation with the articles of merchandise, and a shaft parallel to and driven by said shaft first named, said driven shaft being provided with cam mechanism for actuating said means for feeding the articles of merchandise.

32. In a wrapping machine, the combination with means for supplying the wrapping material and means for feeding the articles of merchandise to be wrapped, of means for twisting the wrapping material to retain it in enveloping relation with the articles of merchandise, said means including traveling devices provided with twisting bars arranged at alternately short and long intervals, and means for causing the feeding means to deliver the articles of merchandise to the alternate short intervals between the twisting bars.

33. In a wrapping machine, the combination with means for supplying the wrapping material and means for feeding the articles of merchandise to be wrapped, of means for twisting the wrapping material to retain it in enveloping relation with the articles of merchandise, said means including a traveling device provided with twisting bars arranged at intervals, and means for severing the wrapping material said severing means arranged to sever the wrapping material at alternate intervals.

34. In a wrapping machine, the combination with means for supplying the wrapping material and means for feeding the articles of merchandise to be wrapped, of means for twisting the wrapping material to retain it in enveloping relation with the articles of merchandise, said means including a traveling member provided with twisting devices arranged at intervals, and means for severing the wrapping material, the feeding means and the severing means being arranged the one to deliver to the wrapping material, and the other to sever the wrapper, at alternate intervals between the twisting devices.

35. In a wrapping machine, the combination with means for supplying the wrapping material and means for feeding the articles of merchandise to be wrapped, of means for twisting the wrapping material to retain it in enveloping relation with the article of merchandise, said twisting means including a vertically adjustable revoluble shaft on which the twisting devices are mounted, an adjustable bed plate on which the revoluble shaft of the twisting devices is stepped, a driving pulley adjustable on the shaft, and means to control the upward movement of the revoluble shaft of the twisting devices.

In testimony whereof I affix my signature, in the presence of two subscribing witnesses.

CLARENCE C. PAGE.

Witnesses:
W. L. J. DAVIES,
A. H. DE GALYER.